United States Patent
Saijo (10) Patent No.: US 6,501,840 B1
(45) Date of Patent: Dec. 31, 2002

(54) CRYPTOGRAPHIC PROCESSING APPARATUS CRYPTOGRAPHIC PROCESSING METHOD AND RECORDING MEDIUM FOR RECORDING A CRYPTOGRAPHIC PROCESSING PROGRAM

(75) Inventor: Takeshi Saijo, Obu (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/245,935

(22) Filed: Feb. 5, 1999

(30) Foreign Application Priority Data

Feb. 6, 1998 (JP) ............................ 10-025244

(51) Int. Cl.$^7$ ...................... H04K 1/04; H04L 9/32; G06F 15/00; G06F 9/00
(52) U.S. Cl. ..................... 380/37; 713/189; 712/34; 709/104
(58) Field of Search ........................ 713/189; 380/37; 712/34; 709/104

(56) References Cited

U.S. PATENT DOCUMENTS

| | | | | |
|---|---|---|---|---|
| 4,907,275 A | * | 3/1990 | Hashimoto | 380/37 |
| 5,142,579 A | * | 8/1992 | Anderson | 380/30 |
| 5,201,000 A | * | 4/1993 | Matyas et al. | 380/30 |
| 5,297,206 A | * | 3/1994 | Orton | 380/30 |
| 5,509,091 A | * | 4/1996 | Aoki | 382/298 |
| 5,708,714 A | * | 1/1998 | Lopez et al. | 380/30 |
| 5,793,871 A | * | 8/1998 | Jackson | 380/28 |
| 6,108,047 A | * | 8/2000 | Chen | 348/581 |
| 6,298,136 B1 | * | 10/2001 | Den Boer | 380/29 |
| 6,307,936 B1 | * | 10/2001 | Ober et al. | 380/30 |

FOREIGN PATENT DOCUMENTS

JP 10191069 7/1998

OTHER PUBLICATIONS

Schneier, Bruce, Applied Cryptography, 1996, John Wiley and Sons, Inc., vol. 2, pp. 344–346.*
The C Programming Language, Second Edition, Kyoritsu Shuppan, 1989 Brian W. Kernighan, Dennis M. Ritchie.
The Programmer's Essential OS/2 Handbook, David E. Cortesi, 1990, Nihon Softbank Shuppan.
PKCS#11: Cryptographic Token Interface Standard, An RSA Laboratories Technical Note, Version 1.0, Apr. 28, 1995, pp. 1–19.

* cited by examiner

Primary Examiner—Gilberto Barrón
Assistant Examiner—Douglas J. Meislahn (57) ABSTRACT

The output data storage unit 126 allocates a memory area and stores cipher text and plain text; the input data size calculation unit 127 calculates the sizes of cipher text and plain text; the type storage unit 128 stores a cryptographic processing type and an algorithm type; the type providing unit 129 outputs the cryptographic processing type and the algorithm type to the type information storage unit 113; the type information storage unit 113 stores an output size table, cryptographic processing type information, and algorithm type information; the output data size judgement unit 114 calculates an output data size according to an input data size, the cryptographic processing type, and the algorithm type.

20 Claims, 6 Drawing Sheets

OUTPUT SIZE TABLE (201)

| CRYPTO-GRAPHIC PROCESSING TYPE (211) | ALGORITHM TYPE (212) | OUTPUT DATA SIZE CALCULATION EXPRESSION (213) |
|---|---|---|
| ENCRYPTION | DES | $\left[\dfrac{x+7}{8}\right] \times 8$ |
| DECRYPTION | DES | $x$ |
| ENCRYPTION | MY-ELLTY (MATSUSHITA ELLIPTIC CURVE CRYPTOSYSTEM) | $\left[\dfrac{x+(k-1)}{k}\right] \times k \times 3$ |
| DECRYPTION | MY-ELLTY (MATSUSHITA ELLIPTIC CURVE CRYPTOSYSTEM) | $\left[\dfrac{x+(3 \times k-1)}{3 \times k}\right] \times k$ |
| SIGNATURE GENERATION | MY-ELLTY (MATSUSHITA ELLIPTIC CURVE CRYPTOSYSTEM) | $\left[\dfrac{x+(k-1)}{k}\right] \times k \times 2$ |
| SIGNATURE VERIFICATION | MY-ELLTY (MATSUSHITA ELLIPTIC CURVE CRYPTOSYSTEM) | 0 |
| SIGNATURE GENERATION WITH RECOVERY | MY-ELLTY (MATSUSHITA ELLIPTIC CURVE CRYPTOSYSTEM) | $\left[\dfrac{x+(k-1)}{k}\right] \times k \times 2$ |
| SIGNATURE VERIFICATION WITH RECOVERY | MY-ELLTY (MATSUSHITA ELLIPTIC CURVE CRYPTOSYSTEM) | $\left[\dfrac{x+(2 \times k-1)}{2 \times k}\right] \times k$ |

- EXPRESSION IN SQUARE BRACKET REPRESENT CALCULATION WHERE FRACTIONAL PORTION OF NUMBER IS DROPPED
- "X" GIVES SIZE OF INPUT DATA
- "K" GIVES KEY SIZE USED BY MY-ELLTY (MATSUSHITA ELLIPTIC CURVE CRYPTOSYSTEM)

| CRYPTOGRAPHIC PROCESSING TYPE | ENCRYPTION PROCESSING |
|---|---|
| ALGORITHM TYPE | RSA |

OUTPUT SIZE TABLE (251)

| CRYPTO-GRAPHIC PROCESSING TYPE (241) | ALGORITHM TYPE (242) | OUTPUT DATA SIZE CALCULATION EXPRESSION (243) | DATA PROCESSING UNIT SIZE (244) |
|---|---|---|---|
| ENCRYPTION | DES | $\left[\dfrac{x+7}{8}\right] \times 8$ | 8 |
| DECRYPTION | DES | $x$ | 8 |
| ENCRYPTION | MY-ELLTY (MATSUSHITA ELLIPTIC CURVE CRYPTOSYSTEM) | $\left[\dfrac{x+(k-1)}{k}\right] \times k \times 3$ | k |
| DECRYPTION | MY-ELLTY (MATSUSHITA ELLIPTIC CURVE CRYPTOSYSTEM) | $\left[\dfrac{x+(3 \times k-1)}{3 \times k}\right] \times k$ | k |
| SIGNATURE GENERATION | MY-ELLTY (MATSUSHITA ELLIPTIC CURVE CRYPTOSYSTEM) | $\left[\dfrac{x+(k-1)}{k}\right] \times k \times 2$ | k |
| SIGNATURE VERIFICATION | MY-ELLTY (MATSUSHITA ELLIPTIC CURVE CRYPTOSYSTEM) | 0 | k |
| SIGNATURE GENERATION WITH RECOVERY | MY-ELLTY (MATSUSHITA ELLIPTIC CURVE CRYPTOSYSTEM) | $\left[\dfrac{x+(k-1)}{k}\right] \times k \times 2$ | k |
| SIGNATURE VERIFICATION WITH RECOVERY | MY-ELLTY (MATSUSHITA ELLIPTIC CURVE CRYPTOSYSTEM) | $\left[\dfrac{x+(2 \times k-1)}{2 \times k}\right] \times k$ | k |

- EXPRESSION IN SQUARE BRACKET REPRESENT CALCULATION WHERE FRACTIONAL PORTION OF NUMBER IS DROPPED
- "X" GIVES SIZE OF INPUT DATA
- "K" GIVES KEY SIZE USED BY MY-ELLTY (MATSUSHITA EELLIPTIC CURVE CRYPTOSYSTEM)

CRYPTOGRAPHIC PROCESSING APPARATUS CRYPTOGRAPHIC PROCESSING METHOD AND RECORDING MEDIUM FOR RECORDING A CRYPTOGRAPHIC PROCESSING PROGRAM

This application is based on application No. H10-025244 filed in Japan, the content of which is hereby incorporated by reference.

BACKGROUND OF THE INVENTION

1. Field of the Invention

The present invention relates to a cryptographic processing apparatus and a user apparatus for the cryptographic processing apparatus, a cryptographic processing method and a user method for the cryptographic processing method, and a recording medium for recording a program, used as a means for secure communications.

2. Description of the Prior Art

Cryptographic methods are used for protecting important information from being intercepted by third parties. various privacy communication apparatuses that use cryptographic methods have been developed.

PKCS#11 (Cryptographic Token Interface Standard) proposed by RSA Data Security, Inc. defines an interface linking a cryptographic processing apparatus and a user apparatus for the cryptographic processing apparatus, where a system that uses cryptographic methods is divided into a cryptographic processing apparatus and a user apparatus.

According to this standard, the cryptographic processing apparatus first receives (1) text data, such as plain text and cipher text, (2) a specification of a cryptographic processing type, such as encryption, decryption, digital signature generation, digital signature verification, and message digesting, and (3) a specification of an algorithm type that includes information relating to the computation/calculation method and a key size. The cryptographic processing apparatus then generates cryptographically processed data, such as cipher text (encrypted plain text) and plain text (decrypted cipher text), by processing the received text data according to the cryptographic method that corresponds to the received cryptographic processing type specification and algorithm type specification. Finally, the cryptographic processing apparatus outputs the generated cryptographically processed data to the user apparatus. The user apparatus (1) outputs the plain text, the cipher text, the cryptographic processing type specification, and the algorithm type specification to the cryptographic processing apparatus, (2) receives the cryptographically processed data from the cryptographic processing apparatus, and (3) may send the received cryptographically processed data to other user apparatuses.

It should be noted here that the cryptographic processing type and the algorithm type are together hereinafter referred to as the cryptographic algorithm.

The interface defined by PKCS#11 offers a number of advantages. For instance, when the cryptographic processing apparatus supports a plurality of cryptographic algorithms, the user apparatus can use any of these cryptographic algorithms by merely specifying the desired cryptographic algorithm. Also, when a new cryptographic method is devised, only the design of the cryptographic processing apparatus needs to be changed. Therefore, the design of the user apparatus does not need to be changed. Furthermore, when a new application of a existing cryptographic method is devised, only the design of the user apparatus needs to be changed. Therefore, the design of the cryptographic processing apparatus does not need to be changed.

In general, every cryptographic method corresponding to a cryptographic processing type and an algorithm type processes data in the same way. That is, plain text or cipher text is processed according to the cryptographic method and encrypted plain text or decrypted cipher text is output. The relation between the sizes of the input data and the output data differs depending on the cryptographic algorithm used. Consequently, the memory area for storing the output data is allocated in advance according to prestored information as to the output data sizes which correspond to respective cryptographic processing types and algorithm types.

Cryptographic processing methods can be classified into stream cipher and block cipher. With the stream cipher, the cryptographic processing is performed on each character in character strings to be processed. With the block cipher, character strings to be processed are divided into blocks of a certain size and each of the blocks is processed according to the block cipher. For instance, when input data, such as plain text, is processed according to the block cipher, the user apparatus divides the input data into blocks according to a block size and outputs the blocks to the cryptographic processing apparatus. The cryptographic processing apparatus processes each block output from the user apparatus according to the block cipher. Therefore, the cryptographic processing apparatus does not need to perform a buffering process or a padding process to make the input data a multiple of the block size. As a result, the cryptographic processing apparatus can perform the cryptographic processing efficiently when a block cipher is used. Because the suitable block size differs depending on the cryptographic algorithm and key size used, the user apparatus determines the size of each input data block for the cryptographic processing apparatus according to a pre-registered list of input data block sizes for respective cryptographic processing types and algorithm types.

As described above, when a cryptographic system where the user apparatus and the cryptographic processing apparatus are linked by an interface is developed, the cryptographic processing apparatus stores algorithms for a plurality of cryptographic methods. Therefore, the user apparatus only needs to specify a cryptographic algorithm to the cryptographic processing apparatus to use the cryptographic algorithm. However, because the user apparatus stores output data sizes and input data block sizes for respective cryptographic processing types and algorithm types, the design of the user apparatus needs to be changed when a new cryptographic processing type or a new algorithm type is devised.

SUMMARY OF THE INVENTION

In view of the stated problems, it is the object of the present invention to provide a cryptographic processing apparatus and a user apparatus, a cryptographic processing system including the cryptographic processing apparatus and the user apparatus, a cryptographic processing method and a user method, and a recording medium for recording a program of these methods, where the design of the user apparatus does not need to be changed, even when a new cryptographic processing type or a new algorithm type is devised.

To achieve the stated object, the cryptographic system of the present invention includes a user apparatus and a cryptographic processing apparatus, the user apparatus sending a size of first data to the cryptographic processing apparatus and receiving a size of second data from the cryptographic processing apparatus, the cryptographic processing apparatus calculating the size of the second data according to the sent size of the first data and sending the calculated size of the second data to the user apparatus, the second data being generated by processing the first data according to a cryptographic algorithm, where the user apparatus includes a data storage unit, an input size calculation unit, an algorithm specifying unit, and a size receiving unit, and the cryptographic processing apparatus includes an arithmetic expression storage unit, an information receiving unit, an arithmetic expression fetching unit, and an output size calculation unit, where the data storage unit stores the first data, the input size calculation unit reads the first data from the data storage unit, calculates a size of the read first data as a first size, and outputs first size information showing the first size to the information receiving unit, the algorithm specifying unit outputs type information showing an algorithm type that corresponds to a cryptographic algorithm to the information receiving unit, the arithmetic expression storage unit stores at least one pair of an algorithm type and an arithmetic expression, the arithmetic expression being used to calculate an output size from an input size, the output size showing a size of data that would be generated if data of the input size were processed according to a cryptographic algorithm that corresponds to the algorithm type in a same pair as the arithmetic expression, the information receiving unit receives the outputted first size information and the outputted type information, the arithmetic expression fetching unit fetches an arithmetic expression in a same pair as the algorithm type shown by the type information from the arithmetic expression storage unit, the output size calculation unit calculates the output size according to the fetched arithmetic expression with the first size shown by the first size information as the input size, and outputs second size information showing the calculated output size as a second size to the size receiving unit, and the size receiving unit receives the outputted second size information.

With the stated construction, even when the user apparatus does not prestore relations between cryptographic algorithms and sizes of encrypted data, such as cipher text, which is generated by processing non-encrypted data, such as plain text, according to the cryptographic algorithms, the cryptographic processing apparatus outputs the sizes of encrypted data to the user apparatus. As a result, the design of the user apparatus does not need to be changed even when a new cryptographic processing type or a new algorithm type is devised. Also, the user apparatus allocates a memory according to the outputted sizes before the non-encrypted data is processed.

To achieve the stated object, the cryptographic system of the present invention includes a user apparatus and a cryptographic processing apparatus, the user apparatus dividing first data into a plurality of first blocks according to a block size used by a cryptographic algorithm and is sent from the cryptographic processing apparatus and sending the plurality of first blocks to the cryptographic processing apparatus, the cryptographic processing apparatus sending the block size to the user apparatus and processing the plurality of first blocks sent from the user apparatus according to the cryptographic algorithm, every cryptographic algorithm used by the cryptographic processing apparatus being a block cryptographic algorithm, where the user apparatus includes a data storage unit, an algorithm specifying unit, a block size receiving unit, a data output unit, and a block receiving unit, and the cryptographic processing apparatus includes a block size storage unit, a receiving unit, a block size fetching unit, a block size output unit, and a cryptographic processing unit, where the data storage unit stores the first data, the algorithm specifying unit outputs type information showing an algorithm type that corresponds to a cryptographic algorithm to the receiving unit, the block size storage unit stores at least one pair of an algorithm type and a block size, the block size being used by a cryptographic algorithm that corresponds to the algorithm type in a same pair as the block size, the receiving unit receives the outputted type information, the block size fetching unit fetches a block size in a same pair as the algorithm type shown by the received type information from the block size storage unit, the block size output unit outputs block size information showing the fetched block size to the block size receiving unit, the block size receiving unit receives the outputted block size information, the data output unit reads the first data from the data storage unit, divides the read first data according to the block size shown by the received block size information to generate the plurality of first blocks, and outputs the plurality of first blocks to the cryptographic processing unit, the cryptographic processing unit receives the outputted plurality of first blocks, processes each of the received plurality of first blocks according to the cryptographic algorithm that corresponds to the algorithm type shown by the type information to generate a plurality of second blocks, and outputs each of the plurality of second blocks to the block receiving unit, and the block receiving unit receives the outputted plurality of second blocks.

With the stated construction, in the case where a block cipher is used, even when the user apparatus does not store relations between cryptographic algorithms and block sizes, the cryptographic processing apparatus outputs the block sizes to the user apparatus and the user apparatus divides non-encrypted data into a plurality of blocks according to the outputted block sizes and outputs the plurality of blocks. As a result, even when a new cryptographic processing type or a new algorithm type is devised, the design of the user apparatus does not need to be changed so that the user apparatus calculates the block size corresponding to the new cryptographic processing type or the new algorithm type.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

Embodiment 1

The following is a description of the constructions and the operations of an e-mail (electronic mail) send/receive apparatus 121 and a cryptographic processing apparatus 111 of Embodiment 1 of the present invention.

Figure 1:
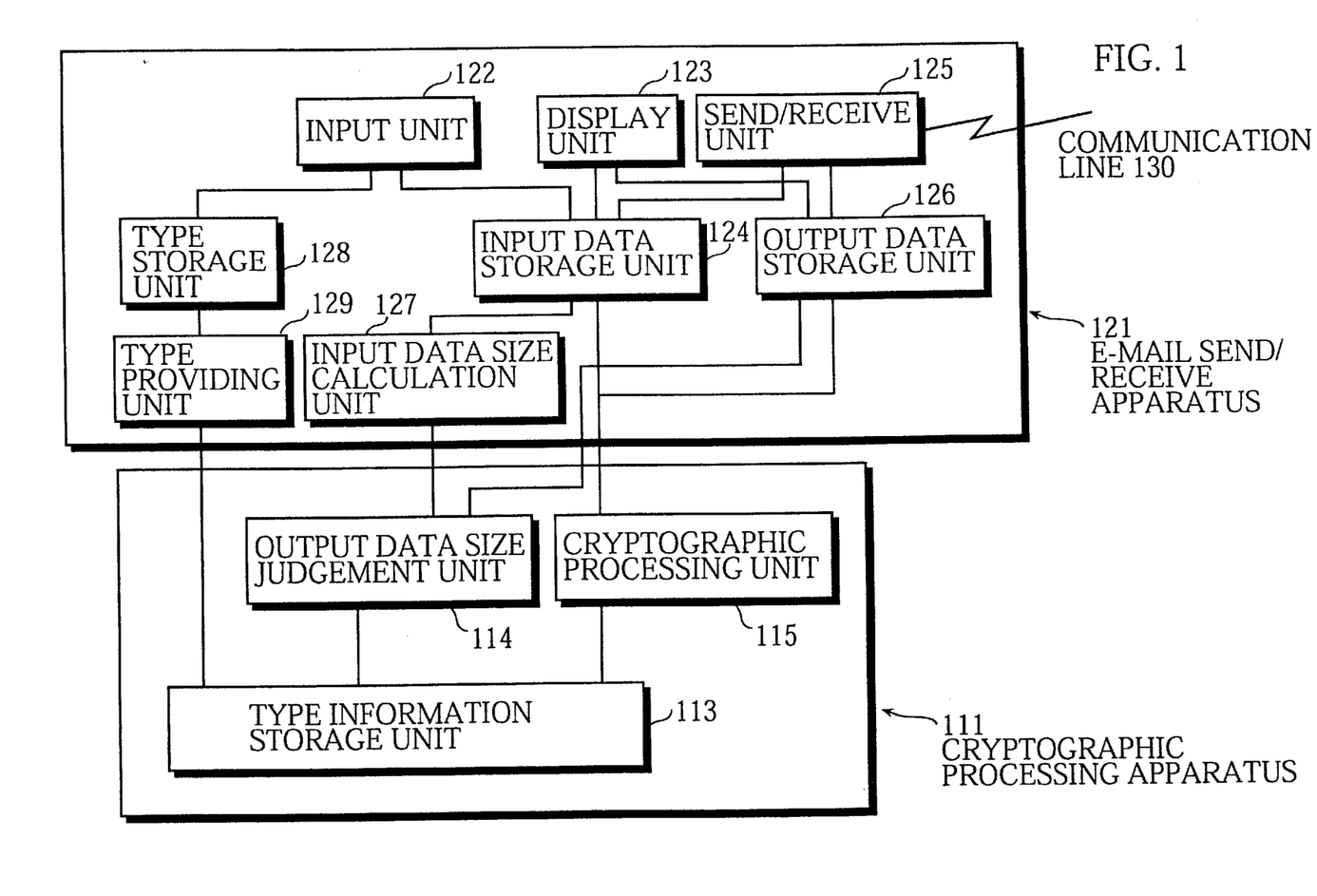
FIG. 1 is a block diagram showing the constructions of an e-mail send/receive apparatus and a cryptographic processing apparatus of Embodiment 1 of the present invention.

Construction of E-mail Send/Receive Apparatus and Cryptographic Processing Apparatus The following description concerns the constructions of the e-mail send/receive apparatus 121 and the cryptographic processing apparatus 111, with reference to the block diagram shown in FIG. 1.

The e-mail send/receive apparatus 121 includes an input unit 122, a display unit 123, an input data storage unit 124, a send/receive unit 125, an output data storage unit 126, an input data size calculation unit 127, a type storage unit 128, and a type providing unit 129. The cryptographic processing apparatus 111 includes a type information storage unit 113, an output data size judgement unit 114, and a cryptographic processing unit 115.

The input unit 122 (1) receives inputs of a cryptographic processing type, an algorithm type, and the contents of a message to be sent, (2) outputs the received cryptographic processing type and algorithm type to the type storage unit 128, and (3) outputs the received message contents to the input data storage unit 124.

The display unit 123 reads the message contents from the input data storage unit 124 and displays the read message contents. Also, the display unit 123 reads contents of a message that is sent from another e-mail send/receive apparatus as cipher text and is decrypted into plain text from the output data storage unit 126, and displays the read contents.

The input data storage unit 124 stores the contents of a message to be sent that is output from the input unit 122 and cipher text output from the send/receive unit 125. Also, the input data storage unit 124 outputs the stored message contents and cipher text to the cryptographic processing unit 115.

The send/receive unit 125, which is connected to a communication line 130, reads cipher text from the output data storage unit 126 and sends the read cipher text through the communication line 130. Also, the send/receive unit 125 receives cipher text that is sent from another e-mail send/receive apparatus through the communication line 130 and outputs the received cipher text to the input data storage unit 124.

The output data storage unit 126 receives an output data size from the output data size judgement unit 114 and allocates a memory area of the received output data size. Also, the output data storage unit 126 stores cipher text and plain text output from the cryptographic processing unit 115.

The input data size calculation unit 127 calculates the input data size of cipher text or plain text that is transferred from the input data storage unit 124 to the cryptographic processing unit 115 and outputs the calculated input data size to the output data size judgement unit 114.

The type storage unit 128 stores. the cryptographic processing type and algorithm type received by the input unit 122.

The type providing unit 129 reads the cryptographic processing type and algorithm type from the type storage unit 128 and outputs the read cryptographic processing type and algorithm type to the type information storage unit 113 of the cryptographic processing apparatus 111.

Figure 2:
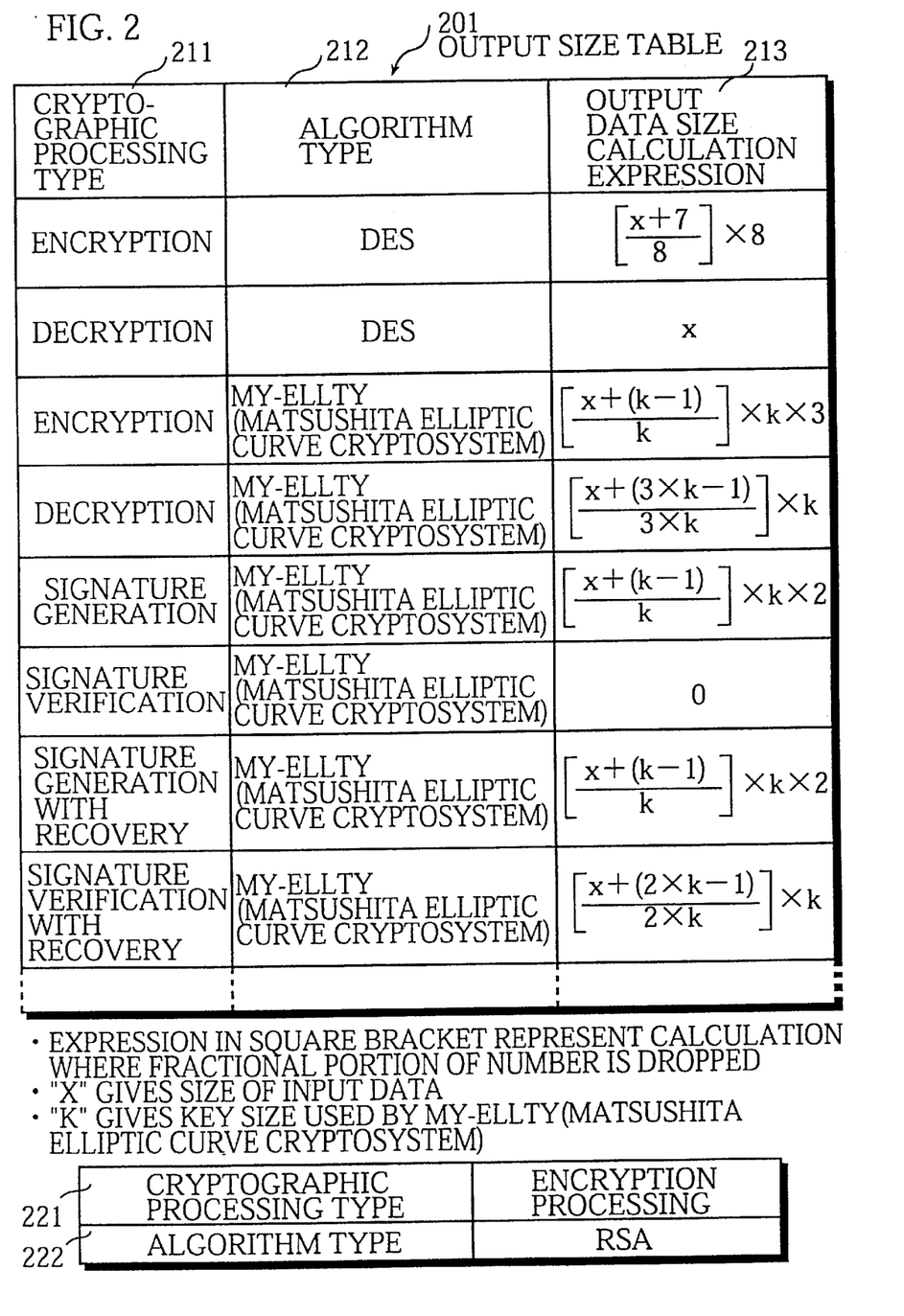
FIG. 2 shows the information stored in the type information storage unit of the cryptographic processing apparatus shown in FIG. 1.

The type information storage unit 113 stores an output size table 201, cryptographic processing type information 221, and algorithm type information 222, as shown in FIG. 2.

The output size table 201 includes a plurality of sets which each include a cryptographic processing type 211, an algorithm type 212, and an output data size calculation expression 213. The cryptographic processing type 211 is information as to a cryptographic processing type, such as encryption, decryption, digital signature generation, digital signature verification, or message digesting. The algorithm type 212 is information as to an algorithm type, and shows a calculation method and a key size. The output data size calculation expression 213 is a calculation expression corresponding to the cryptographic processing type 211 and the algorithm type 212. The calculation expression 213 is used for calculating the output data size corresponding to an input data size "x". When a cryptographic processing type 211 and an algorithm type 212 are specified, the corresponding output data size can be calculated according to the calculation expression 213 that corresponds to the specified cryptographic processing type 211 and algorithm type 212.

The cryptographic processing type information 221 and the algorithm type information 222 respectively give the cryptographic processing type and the algorithm type output from the type providing unit 129. The cryptographic processing type can be, for instance, encryption, decryption, digital signature generation, digital signature verification, or message digesting. The algorithm type can be, for instance, DES (Data Encryption Standard) or RSA. The cryptographic processing type and the algorithm type are used to specify a cryptographic algorithm. In this example, when a cryptographic processing method requires a key, the algorithm type also shows the size of the key.

The output data size judgement unit 114 receives the input data size from the input data size calculation unit 127. Also, the output data size judgement unit 114 reads the cryptographic processing type information 221 and the algorithm type information 222 from the type information storage unit 113, searches the output size table 201 for a cryptographic processing type 211 and an algorithm type 212 which respectively correspond to the cryptographic processing type information 221 and algorithm type information 222, and specifies an output data size calculation expression 213 corresponding to the cryptographic processing type 211 and the algorithm type 212. Then, the output data size judgement unit 114 calculates an output data size according to the specified output data size calculation expression 213 and the received input data size, and outputs the calculated output data size to the output data storage unit 126.

The cryptographic processing unit 115 reads the input data from the input data storage unit 124, generates output data by processing the read input data according to the cryptographic method that corresponds to the cryptographic processing type information 221 and the algorithm type information 222 stored in the type information storage unit 113, and outputs the generated output data to the output data storage unit 126.

Figure 3:
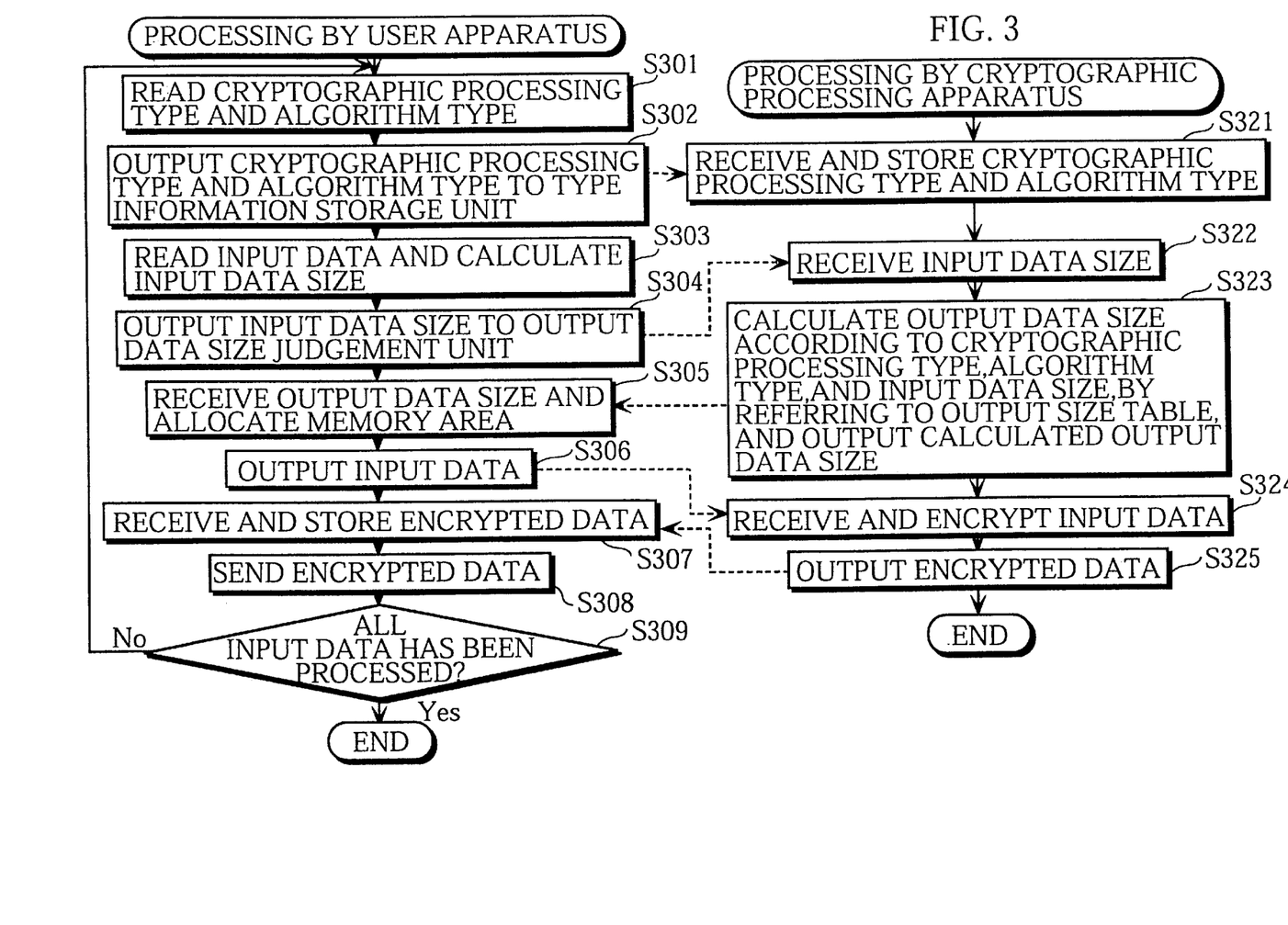
FIG. 3 is a flowchart showing the operations of the e-mail send/receive apparatus and the cryptographic processing apparatus shown in FIG. 1.

Operation of E-mail Send/Receive Apparatus and Cryptographic Processing Apparatus The following description concerns the operations of the e-mail send/receive apparatus 121 and the cryptographic processing apparatus 111 shown in FIG. 1, with reference to the flowchart shown in FIG. 3.

The type providing unit 129 reads a cryptographic processing type and an algorithm type from the type storage unit 128 (step S301) and outputs the read cryptographic processing type and algorithm type to the type information storage unit 113 (step S302). The type information storage unit 113 receives and stores the cryptographic processing type and algorithm type output from the type providing unit 129 as the cryptographic processing type information 221 and the algorithm type information 222 (step S321). The input data size calculation unit 127 reads input data from the input data storage unit 124, calculates the size of the read input data (step S303), and outputs the calculated input data size to the output data size judgement unit 114 (step S304). The output data size judgement unit 114 receives the input data size from the input data size calculation unit 127 (step S322), reads the cryptographic processing type information 221 and the algorithm type information 222 from the type information storage unit 113, searches the output size table 201 for a cryptographic processing type 211 and an algorithm type 212 which respectively correspond to the read cryptographic processing type information 221 and algorithm type information 222, specifies an output data size calculation expression 213 corresponding to the cryptographic processing type 211 and the algorithm type 212, calculates an output data size according to the received input data size and the specified output data size calculation expression 213, and outputs the calculated output data size to the output data storage unit 126 (step S323). The output data storage unit 126 receives the output data size and allocates a memory area of the received output data size for storing output data (step S305). The input data storage unit 124 outputs input data to the cryptographic processing unit 115 (step S306). The cryptographic processing unit 115 reads the input data from the input data storage unit 124, encrypts the read input data (step S324), and outputs the encrypted input data to the output data storage unit 126 (step S325). The output data storage unit 126 receives and stores the encrypted input data (step S307). The send/receive unit 125 reads the encrypted input data from the output data storage unit 126 and sends the encrypted input data through the communication line 130 (step S308).

The input unit 122 judges whether all input data has been processed (step S309). If the judgement result is affirmative, the processing in this flowchart is terminated; if the judgement result is negative, the processing returns to step S301 to repeat the aforementioned steps.

It should be noted here that although this example concerns an encryption operation, the same procedure is performed for a decryption operation.

Example of Encryption Processing Using ElGamal Cryptographic Algorithm

The following is a description of a case where the ElGamal cryptographic algorithm, that is one of public-key cryptosystems, is used as the algorithm type.

With the ElGamal cryptographic algorithm, input data of a size equal to the encryption key size is encrypted, data of a size of twice the input data size is generated, and the encrypted data is output. Therefore, assuming that an ElGamal cryptographic algorithm with a 64-byte key size is used, the output data size judgement unit 114 judges that the output data size corresponding to input data of no more than 64 bytes is 128 bytes. Then, the output data size judgement unit 114 outputs the judgement result that an output data storage area of 128 bytes is required for 64-byte input data to the e-mail send/receive apparatus 121. After receiving the judgement result, the output data storage unit 126 of the e-mail send/receive apparatus 121 determines that a 128-byte memory area is necessary and sufficient to store the output data, and allocates a 128-byte memory area.

Conclusion

As described above, the output data size judgement unit 114 calculates the output data size according to the cryptographic processing type, the algorithm type, and the input data size, and outputs the calculated output data size to the user apparatus. After receiving the calculated output data size, the user apparatus allocates a memory area of the calculated output data size. As a result, the user apparatus allocates a memory area for storing data output from the cryptographic processing apparatus beforehand but does not perform the cryptographic processing of high computational complexity.

The output data size may be used for judging whether data is to be encrypted. When the output data size is not below a predetermined value, for instance, data may not be encrypted. Also, when the output data size corresponding to a current cryptographic algorithm exceeds a predetermined value, a request for the output data size corresponding to another cryptographic algorithm may be repeatedly issued to the cryptographic processing apparatus until an output data size that does not exceed the predetermined value is obtained.

The present invention has been described above by means of Embodiment 1, although it should be obvious that the present invention is not limited to this embodiment.

The essence of the present invention lies in the cryptographic application method and the cryptographic processing method shown in the flowchart in FIG. 3. Therefore, the present invention may be realized by a computer-readable recording medium that record programs for having a computer perform the cryptographic application method and the cryptographic processing method of the present invention. Furthermore, the cryptographic application program and the cryptographic processing program of the present invention may be distributed through communication lines.

Embodiment 2

The following is a description of the construction and the operation of an e-mail send/receive apparatus 131 and a cryptographic processing apparatus 141.

Figure 4:
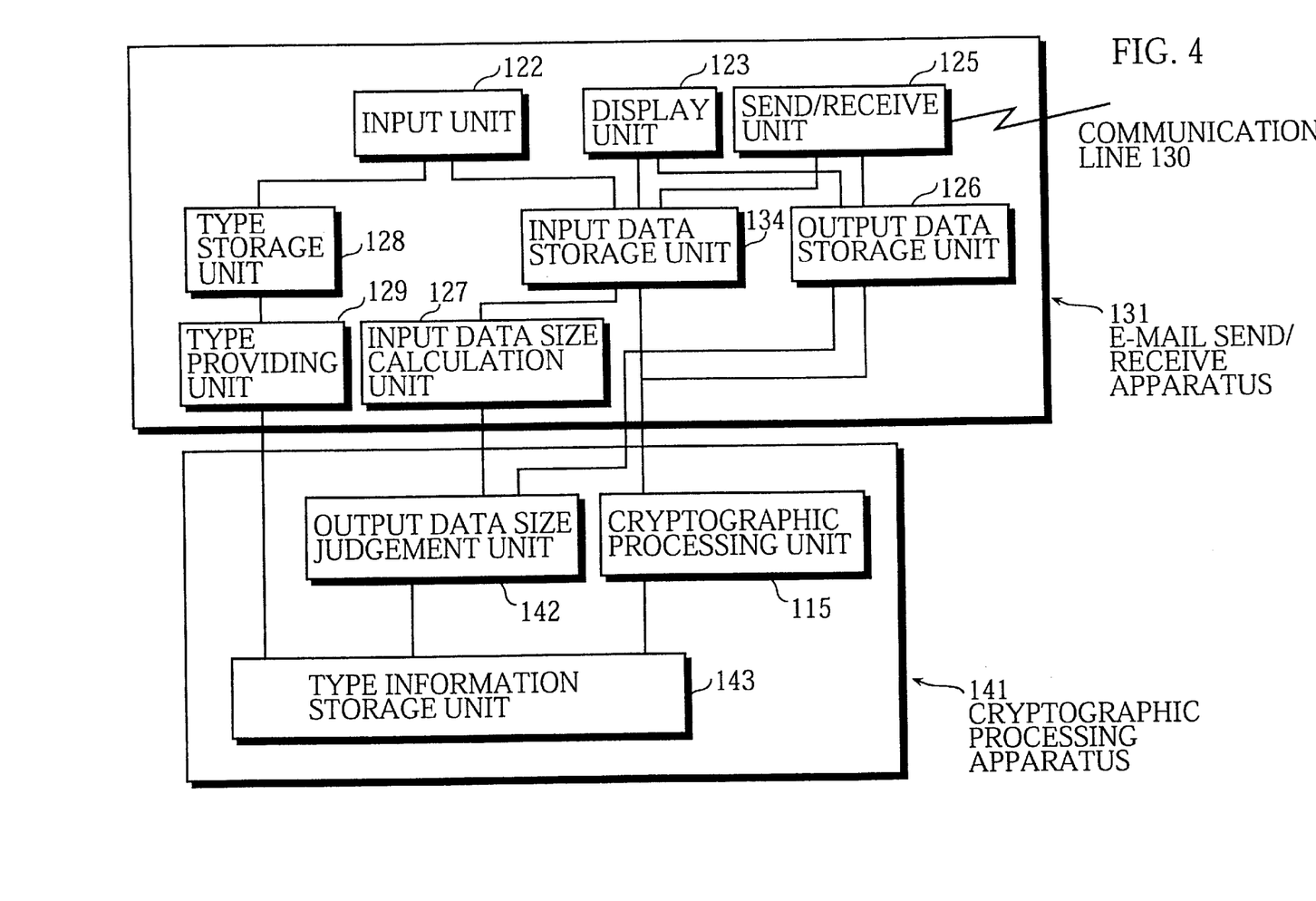
FIG. 4 is a block diagram showing the constructions of an e-mail send/receive apparatus and a cryptographic processing apparatus of Embodiment 2 of the present invention.

Construction of E-mail Send/Receive Apparatus and Cryptographic Processing Apparatus The following is a description of the e-mail send/receive apparatus 131 and the cryptographic processing apparatus 141 of Embodiment 2 of the present invention, with reference to the block diagram shown in FIG. 4.

The e-mail send/receive apparatus 131 includes the input unit 122, the display unit 123, an input data storage unit 134, the send/receive unit 125 connected to the communication line 130, an output data storage unit 126, the input data size calculation unit 127, the type storage unit 128, and the type providing unit 129. The cryptographic processing apparatus 141 includes a type information storage unit 143, an output data size judgement unit 142, and the cryptographic processing unit 115.

The e-mail send/receive apparatus 131 differs from the e-mail send/receive apparatus 121 in that the input data storage unit 134 is used instead of the input data storage unit 124. The cryptographic processing apparatus 141 differs from the cryptographic processing apparatus 111 in that the output data size judgement unit 142 and the type information storage unit 143 are used instead of the output data size judgement unit 114 and the type information storage unit 113.

The following description centers on the different elements.

Figure 5:
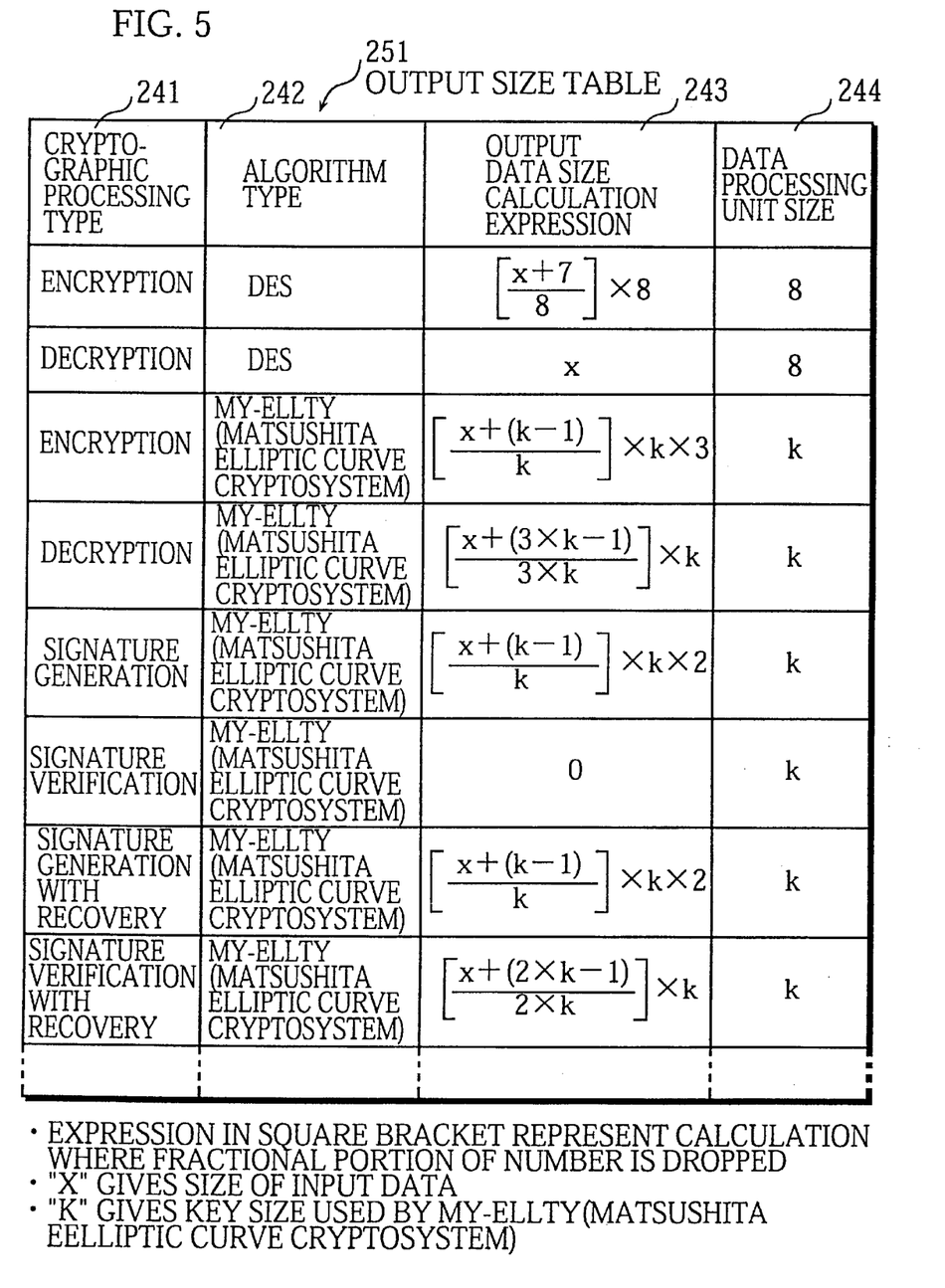
FIG. 5 shows the information stored in the type information storage unit of the cryptographic processing apparatus shown in FIG. 4.

The type information storage unit 143 stores the output size table 251 shown in FIG. 5 instead of the output size table 201. The other elements of the type information storage unit 143 are the same as those of the type information storage unit 113 and so are not described here.

The output size table 251 includes a plurality of sets which each include a cryptographic processing type 241, an algorithm type 242, an output data size calculation expression 243, and a data processing unit size 244. The cryptographic processing type 241, the algorithm type 242, and the output data size calculation expression 243 are respectively the same as the cryptographic processing type 221, the algorithm type 212, and the output data size calculation expression 213 of the output size table 201 and so are not described here.

The cryptographic processing methods can be ordinarily classified into block cipher and stream cipher. With the block cipher, each character string (each block) of a size of one or more characters is converted into another character string (another block). With the stream cipher, each character or each bit is converted into another character or another bit.

For conventional block cipher, cryptographic processing is usually performed on data blocks of a size that is inherent in the algorithm used. Therefore, the data processing unit size for cryptographic processing is set to the size of each data block. When the input data, which is to say data to be cryptographically processed, is large, the user apparatus divides the input data according to a unit size suitable for the efficient use of memory areas, inputs each piece of the divided input data into the cryptographic processing apparatus, and obtains output data from the cryptographic processing apparatus. When the input piece of the divided input data is not a multiple of the data block size, the cryptographic processing apparatus needs to perform a buffering process or a padding process to make the input piece of the divided input data a multiple of the data block size. Therefore, when the size of the input piece of the divided input data is equal to the data block size, the most efficient cryptographic processing is performed. The data processing unit size 244 represents the data block size in the case where data is divided into blocks.

The output data size judgement unit 142 reads the cryptographic processing type information 221 and the algorithm type information 222 from the type information storage unit 143. Then the output data size judgement unit 142 searches the output size table 251 for a cryptographic processing type 241 and an algorithm type 242 which respectively correspond to the cryptographic processing type information 221 and algorithm type information 222, and specifies a data processing unit size 244 corresponding to the cryptographic processing type 241 and the algorithm type 242. The output data size judgement unit 142 calculates a data processing unit size of input data according to the specified data processing unit size 244 and outputs the calculated data processing unit to the output data storage unit 134. Other operations of the output data size judgement unit 142 are the same as those of the output data size judgement unit 114 and so are not described here.

The input data storage unit 134 receives the data processing unit from the output data size judgement unit 142, divides the contents of a message to be sent and cipher text output from another e-mail send/receive apparatus according to the received data processing unit, and sends the divided contents or cipher text to the cryptographic processing unit 115. Other operations of the input data storage unit 134 are the same as those of the input data storage unit 124 and so are not described here.

Figure 6:
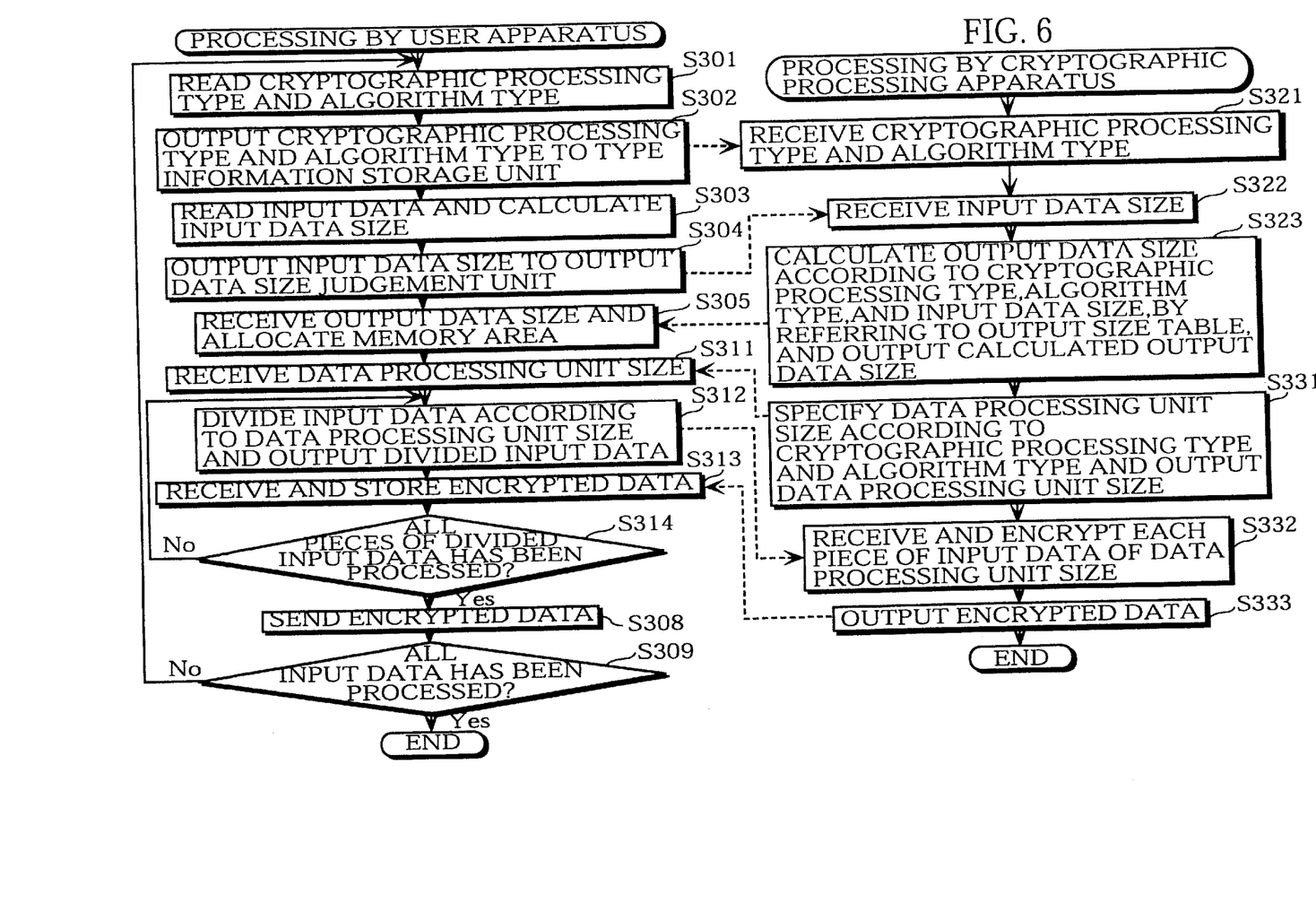
FIG. 6 is a flowchart showing the operations of the e-mail send/receive apparatus and the cryptographic processing apparatus shown in FIG. 4.

Operation of E-mail Send/Receive Apparatus and Cryptographic Processing Apparatus The following description concerns the operations of the e-mail send/receive apparatus 131 and the cryptographic processing apparatus 141, with reference to the flowchart shown in FIG. 6. The flowchart shown in FIG. 6 differs from that shown in FIG. 3 in that new steps S311 and S331 are respectively added after steps S305 and S323, and steps S312–S314, S332, and S333 are respectively used instead of steps S306–S307, S324, and S325. The same operations are performed in the steps with the same numbers. Therefore, the following description centers on the operations in the different steps and the same operations are omitted.

In step S331, the output data size judgement unit 142 reads a cryptographic processing type information 221 and an algorithm type information 222 from the type information storage unit 143, searches the output size table 251 for a cryptographic processing type 241 and an algorithm type 242 which respectively correspond to the cryptographic processing type information 221 and the algorithm type information 222, and specifies a data processing unit size 244 corresponding to the cryptographic processing type 241 and the algorithm type 242. Then the output data size judgement unit 142 calculates a data processing unit of input data, such as the contents of a message to be sent and cipher text output from another e-mail send/receive apparatus, according to the specified data processing unit size 244 and outputs the calculated data processing unit to the output data storage unit 134.

In step S311, the input data storage unit 134 receives the calculated data processing unit from the output data size judgement unit 142.

In step S312, the input data storage unit 134 divides the input data according to the received data processing unit, and sends the divided input data to the cryptographic processing unit 115.

In step S332, the cryptographic processing unit 115 receives and encrypts the divided input data.

In step S333, the cryptographic processing unit 115 outputs the encrypted input data to the output data storage unit 126.

In step S313, the output data storage unit 126 receives and stores the encrypted input data.

In step S314, if all pieces of the divided input data have been processed, the input data storage unit 134 has the processing proceed to step S308; if this is not the case, the input data storage unit 134 has the process proceed to step 312.

It should be noted here that although this example concerns an encryption operation, the same procedure is performed for a decryption operation.

Example of Encryption Processing Using Secret-Key Cryptosystem "DES"

The following is a description of a case where the secret-key cryptosystem "DES" is used as the algorithm type.

With DES, input data is encrypted in units of eight bytes. Therefore, the output data size judgement unit 142 of the cryptographic processing apparatus 141 informs the input data storage unit 134 of the e-mail send/receive apparatus 131 that the most suitable data processing unit size is eight bytes. The input data storage unit 134 divides input data according to the informed data processing unit size, and outputs the divided input data to the cryptographic processing unit 115.

Conclusion

As described above, the user apparatus divides input data for the cryptographic processing apparatus according to the data processing unit size output from the cryptographic processing apparatus. Therefore, the cryptographic processing apparatus does not need to perform a buffering processing or a padding processing to make each piece of divided input data a suitable data block size. As a result, the cryptographic processing is performed efficiently.

The present invention has been described above by means of Embodiment 2, although it should be obvious that the present invention is not limited to this embodiment.

In Embodiment 2, the output size table 251 shown in FIG. 5 includes a plurality of sets which each include the cryptographic processing type 241, the algorithm type 242, the output data size calculation expression 243, and the data processing unit size 244. However, the output size table 251 may include a plurality of sets which each include the cryptographic processing type 241, the algorithm type 242, and the data processing unit size 244. In this case, the output data size judgement unit 142 calculates only the processing unit of input data according to a data processing unit size 244 and outputs the calculated processing unit to the input data storage unit 134. As a result, the output data size judgement unit 142 does not need to calculate the output data size.

The essence of the present invention lies in the cryptographic application method and the cryptographic processing method shown in the flowchart in FIG. 6. Therefore, the present invention may be realized by a computer-readable recording medium that record programs for having a computer perform the cryptographic application method and the cryptographic processing method of the present invention. Also, the cryptographic application program and the cryptographic processing program of the present invention may be distributed through communication lines.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A cryptographic system comprising a user apparatus and a cryptographic processing apparatus, the user apparatus sending a size of first data to the cryptographic processing apparatus and receiving a size of second data from the cryptographic processing apparatus, the cryptographic processing apparatus calculating the size of the second data according to the sent size of the first data and sending the calculated size of the second data to the user apparatus, the second data being generated by processing the first data according to a cryptographic algorithm, wherein the user apparatus includes a data storage means, an input size calculation means, an algorithm specifying means, and a size receiving means, and the cryptographic processing apparatus includes an arithmetic expression storage means, an information receiving means, an arithmetic expression fetching means, and an output size calculation means, wherein the data storage means stores the first data, the input size calculation means reads the first data from the data storage means, calculates a size of the read first data as a first size, and outputs first size information showing the first size to the information receiving means, the algorithm specifying means outputs type information showing an algorithm type that corresponds to a cryptographic algorithm to the information receiving means, the arithmetic expression storage means stores at least one pair of an algorithm type and an arithmetic expression, the arithmetic expression being used to calculate an output size from an input size, the output size showing a size of data that would be generated if data of the input size were processed according to a cryptographic algorithm that corresponds to the algorithm type in a same pair as the arithmetic expression, the information receiving means receives the outputted first size information and the outputted type information, the arithmetic expression fetching means fetches an arithmetic expression in a same pair as the algorithm type shown by the type information from the arithmetic expression storage means, the output size calculation means calculates the output size according to the fetched arithmetic expression with the first size shown by the first size information as the input size, and outputs second size information showing the calculated output size as a second size to the size receiving means, and the size receiving means receives the outputted second size information.

2. A cryptographic system comprising a user apparatus and a cryptographic processing apparatus, the user apparatus dividing first data into a plurality of first blocks according to a block size that is used by a cryptographic algorithm and is sent from the cryptographic processing apparatus and sending the plurality of first blocks to the cryptographic processing apparatus, the cryptographic processing apparatus sending the block size to the user apparatus and processing the plurality of first blocks sent from the user apparatus according to the cryptographic algorithm, every cryptographic algorithm used by the cryptographic processing apparatus being a block cryptographic algorithm, wherein the user apparatus includes a data storage means, an algorithm specifying means, a block size receiving means, a data output means, and a block receiving means, and the cryptographic processing apparatus includes a block size storage means, a receiving means, a block size fetching means, a block size output means, and a cryptographic processing means, wherein the data storage means stores the first data, the algorithm specifying means outputs type information showing an algorithm type that corresponds to a cryptographic algorithm to the receiving means, the block size storage means stores at least one pair of an algorithm type and a block size, the block size being used by a cryptographic algorithm that corresponds to the algorithm type in a same pair as the block size, the receiving means receives the outputted type information, the block size fetching means fetches block size in a same pair as the algorithm type shown by the received type information from the block size storage means, the block size output means outputs block size information showing the fetched block size to the block size receiving means, the block size receiving means receives the outputted block size information, the data output means reads the first data from the data storage means, divides the read first data according to the block size shown by the received block size information to generate a plurality of first blocks, and outputs the plurality of first blocks to the cryptographic processing means, the cryptographic processing means receives the outputted plurality of first blocks, processes each of the received plurality of first blocks according to the cryptographic algorithm that corresponds to the algorithm type shown by the type information to generate a plurality of second blocks, and outputs each of the plurality of second blocks to the block receiving means, and the block receiving means receives the outputted plurality of second blocks.

3. A cryptographic processing apparatus that calculates a size of second data according to a size of first data sent from a user apparatus and sends the calculates size of the second data to the user apparatus, the second data being generated by processing the first data according to a cryptographic algorithm, the cryptographic processing apparatus comprising:

an arithmetic expression storage means for storing at least one pair of an algorithm type and an arithmetic expression, the arithmetic expression being used to calculate an output size from an input size, the output size showing a size of data that would be generated if data of the input size were processed according to a cryptographic algorithm that corresponds to the algorithm type in a same pair as the arithmetic expression;

an information receiving means for receiving type information showing an algorithm type that corresponds to a cryptographic algorithm and first size information showing a first size from the user apparatus, the first size being the size of the first data;

an arithmetic expression fetching means for fetching an arithmetic expression in a same pair as the algorithm type shown by the type information from the arithmetic expression storage means; and an output size calculation means for calculating the output size according to the fetched arithmetic expression with the first size shown by the first size information as the input size, and outputting second size information showing the calculated output size as a second size to the user apparatus.

4. The cryptographic processing apparatus of claim 3 sends a block size used by a cryptographic algorithm to the user apparatus, receives a plurality of first blocks generated by dividing the first data according to the block size from the user apparatus, and processes the plurality of first blocks according to the cryptographic algorithm, every cryptographic algorithm used by the cryptographic processing apparatus being a block cryptographic algorithm, the cryptographic processing apparatus further comprising:

a block size storage means for storing at least one pair of an algorithm type and a block size, the block size being used by a cryptographic algorithm that corresponds to the algorithm type in a same pair as the block size;

a block size fetching means for fetching a block size in a same pair as the algorithm type shown by the type information from the block size storage means;

a block size output means for outputting block size information showing the fetched block size to the user apparatus; and a cryptographic processing means for receiving a plurality of first blocks generated by dividing the first data according to the block size shown by the block size information from the user apparatus, processing each of the received plurality of first blocks according to the cryptographic algorithm that corresponds to the algorithm type shown by the type information to generate a plurality of second blocks, and outputting each of the plurality of second blocks to the user apparatus.

5. The cryptographic processing apparatus of claim 3 sends a block size used by a cryptographic algorithm to the user apparatus, receives a plurality of first blocks generated by dividing the first data according to the block size from the user apparatus, and processes the plurality of first blocks according to the cryptographic algorithm, every cryptographic algorithm used by the cryptographic processing apparatus being a block cryptographic algorithm, the cryptographic processing apparatus further comprising:

an arithmetic expression storage means for storing at least one pair of an algorithm type and an arithmetic expression, the arithmetic expression being used to calculate a block size according to a size of a key used by a cryptographic algorithm that corresponds to the algorithm type in a same pair as the arithmetic expression, the block size being used by the corresponding cryptographic algorithm;

a block size calculation means for fetching an arithmetic expression in a same pair as the algorithm type shown by the type information from the arithmetic expression storage means and calculating a block size according to the fetched arithmetic expression;

a block size output means for outputting a block size information showing the calculated block size to the user apparatus; and a cryptographic processing means for receiving a plurality of first blocks generated by dividing the first data according to the calculated block size from the user apparatus, processing. each of the received plurality of first blocks according to the cryptographic algorithm that corresponds to the algorithm type shown by the type information to generate a plurality of second blocks, and outputting each of the plurality of second blocks to the user apparatus.

6. A cryptographic processing apparatus that sends a block size used by a cryptographic algorithm to a user apparatus, receives a plurality of first blocks generated by dividing first data according to the block size from the user apparatus, and processes the plurality of first blocks according to the cryptographic algorithm, every cryptographic algorithm used by the cryptographic processing apparatus being a block cryptographic algorithm, the cryptographic processing apparatus comprising:

a block size storage means for storing at least one pair of an algorithm type and a block size, the block size being used by a cryptographic algorithm that corresponds to the algorithm type in a same pair as the block size;

a receiving means for receiving type information showing an algorithm type that corresponds to a cryptographic algorithm from the user apparatus;

a block size fetching means for fetching a block size in a same pair as the algorithm type shown by the type information from the block size storage means;

a block size output means for outputting block size information showing the fetched block size to the user apparatus; and a cryptographic processing means for receiving a plurality of first blocks generated by dividing the first data according to the block size shown by the block size information from the user apparatus, processing each of the received plurality of first blocks according to the cryptographic algorithm that corresponds to the algorithm type shown by the type information to generate a plurality of second blocks, and outputting each of the plurality of second blocks to the user apparatus.

7. A cryptographic processing apparatus that sends a block size used by a cryptographic algorithm to a user apparatus, receives a plurality of first blocks generated by dividing first data according to the block size from the user apparatus, and processes the plurality of first blocks according to the cryptographic algorithm, every cryptographic algorithm used by the cryptographic processing apparatus being a block cryptographic algorithm, the cryptographic processing apparatus comprising:

an arithmetic expression storage means for storing at least one pair of an algorithm type and an arithmetic expression, the arithmetic expression being used to calculate a block size according to a size of a key used by a cryptographic algorithm that corresponds to the algorithm type in a same pair as the arithmetic expression, the block size being used by the corresponding cryptographic algorithm;

an information receiving means for receiving type information showing an algorithm type that corresponds to a cryptographic algorithm from the user apparatus;

a block size calculation means for fetching an arithmetic expression in a same pair as the algorithm type shown by the type information from the arithmetic expression storage means and calculating a block size according to the fetched arithmetic expression;

a block size output means for outputting a block size information showing the calculated block size to the user apparatus; and a cryptographic processing means for receiving a plurality of first blocks generated by dividing the first data according to the calculated block size from the user apparatus, processing each of the received plurality of first blocks according to the cryptographic algorithm that corresponds to the algorithm type shown by the type information to generate a plurality of second blocks, and outputting each of the plurality of second blocks to the user apparatus.

8. A user apparatus that sends a size of first data to a cryptographic processing apparatus and receives a size of second data from the cryptographic processing apparatus, the second data being generated by processing the first data according to a cryptographic algorithm, the user apparatus comprising:

a data storage means for storing the first data;

an input size calculation means for reading the first data from the data storage means, calculating a size of the read first data as a first size, and outputting first size information showing the first size to the cryptographic processing apparatus;

an algorithm specifying means for outputting type information showing an algorithm type that corresponds to a cryptographic algorithm to the cryptographic processing apparatus; and a size receiving means for receiving second size information showing a second size from the cryptographic processing apparatus, the second size being the size of the second data and being calculated according to the first size and the cryptographic algorithm that corresponds to the algorithm type shown by the type information.

9. The user apparatus of claim 8 divides the first data into a plurality of first blocks according to a block size sent from the cryptographic processing apparatus and sends the plurality of first blocks to the cryptographic processing apparatus, every cryptographic algorithm used by the cryptographic processing apparatus being a block cryptographic algorithm, the user apparatus further comprising:

a block size receiving means for receiving block size information showing a block size used by the cryptographic algorithm that corresponds to the algorithm type shown by the type information from the cryptographic processing apparatus;

a data output means for reading the first data from the data storage means, dividing the read first data according to the block size shown by the block size information to generate a plurality of first blocks, and outputting the plurality of first blocks to the cryptographic processing apparatus; and a block receiving means for receiving a plurality of second blocks from the cryptographic processing apparatus, the plurality of second blocks being generated by processing each of the plurality of first blocks according to the cryptographic algorithm that corresponds to the algorithm type shown by the type information.

10. A user apparatus that divides first data into a plurality of first blocks according to a block size sent from a cryptographic processing apparatus and sends the plurality of first blocks to the cryptographic processing apparatus, every cryptographic algorithm used by the cryptographic processing apparatus being a block cryptographic algorithm, the user apparatus further comprising:

a data storage means for storing the first data;

an algorithm specifying means for outputting type information showing an algorithm type that corresponds to a cryptographic algorithm to the cryptographic processing apparatus;

a block size receiving means for receiving block size information showing a block size used by the cryptographic algorithm from the cryptographic processing apparatus;

a data output means for reading the first data from the data storage means, dividing the read first data according to the block size shown by the block size information to generate a plurality of first blocks, and outputting the plurality of first blocks to the cryptographic processing apparatus; and a block receiving means for receiving a plurality of second blocks generated by processing each of the plurality of first blocks according to the cryptographic algorithm from the cryptographic processing apparatus.

11. A cryptographic processing method used by a cryptographic processing apparatus that calculates a size of second data according to a size of first data sent from a user apparatus, sends the calculates size of the second data to the user apparatus, and includes an arithmetic expression storage means for storing at least one pair of an algorithm type and an arithmetic expression, the second data being generated by processing the first data according to a cryptographic algorithm, the arithmetic expression being used to calculate an output size from an input size, the output size showing a size of data that would be generated if data of the input size were processed according to a cryptographic algorithm that corresponds to the algorithm type in a same pair as the arithmetic expression, the cryptographic processing method comprising:

an information receiving step for receiving type information showing an algorithm type that corresponds to a cryptographic algorithm and first size information showing a first size from the user apparatus, the first size being the size of the first data;

an arithmetic expression fetching step for fetching an arithmetic expression in a same pair as the algorithm type shown by the type information from the arithmetic expression storage means; and an output size calculation step for calculating the output size according to the fetched arithmetic expression with the first size shown by the first size information as the input size, and outputting second size information showing the calculated output size as a second size to the user apparatus.

12. A cryptographic processing method used by a cryptographic processing apparatus that sends a block size used by a cryptographic algorithm to a user apparatus, receives a plurality of first blocks generated by dividing first data according to the block size from the user apparatus, processes the plurality of first blocks according to the cryptographic algorithm, and includes a block size storage means for storing at least one pair of an algorithm type and a block size that is used by a cryptographic algorithm corresponding to the algorithm type in a same pair as the block size, every cryptographic algorithm used by the cryptographic processing apparatus being a block cryptographic algorithm, the cryptographic processing method comprising:

a receiving step for receiving type information showing an algorithm type that corresponds to a cryptographic algorithm from the user apparatus;

a block size fetching step for fetching a block size in a same pair as the algorithm type shown by the type information from the block size storage means;

a block size output step for outputting block size information showing the fetched block size to the user apparatus; and a cryptographic processing step for receiving a plurality of first blocks generated by dividing the first data according to the block size shown by the block size information from the user apparatus, processing each of the received plurality of first blocks according to the cryptographic algorithm that corresponds to the algorithm type shown by the type information to generate a plurality of second blocks, and outputting each of the plurality of second blocks to the user apparatus.

13. A cryptographic processing method used by a cryptographic processing apparatus that sends a block size used by a cryptographic algorithm to a user apparatus, receives a plurality of first blocks generated by dividing first data according to the block size from the user apparatus, processes the plurality of first blocks according to the cryptographic algorithm, and includes an arithmetic expression storage means for storing at least one pair of an algorithm type and an arithmetic expression, the arithmetic expression being used to calculate a block size used by a cryptographic algorithm that corresponds to the cryptographic algorithm type in a same pair as the arithmetic expression according to a size of a key used by the corresponding cryptographic algorithm, every cryptographic algorithm used by the cryptographic processing apparatus being a block cryptographic algorithm, the cryptographic processing method comprising:

an information receiving step for receiving type information showing an algorithm type that corresponds to a cryptographic algorithm from the user apparatus;

a block size calculation step for fetching an arithmetic expression in a same pair as the algorithm type shown by the type information from the arithmetic expression storage means and calculating a block size according to the fetched arithmetic expression;

a block size output step for outputting a block size information showing the calculated block size to the user apparatus; and a cryptographic processing step for receiving a plurality of first blocks generated by dividing the first data according to the calculated block size from the user apparatus, processing each of the received plurality of first blocks according to the cryptographic algorithm that corresponds to the algorithm type shown by the type information to generate a plurality of second blocks, and outputting each of the plurality of second blocks to the user apparatus.

14. A user method used by a user apparatus that sends a size of first data to a cryptographic processing apparatus, receives a size of second data from the cryptographic processing apparatus, and includes a data storage means for storing the first data, the second data being generated by processing the first data according to a cryptographic algorithm, the user method comprising:

an input size calculation step for reading the first data from the data storage means, calculating a size of the read first data as a first size, and outputting first size information showing the first size to the cryptographic processing apparatus;

an algorithm specifying step for outputting type information showing an algorithm type that corresponds to a cryptographic algorithm to the cryptographic processing apparatus; and a size receiving step for receiving second size information showing a second size from the cryptographic processing apparatus, the second size being the size of the second data and being calculated according to the first size and the cryptographic algorithm that corresponds to the algorithm type shown by the type information.

15. A user method used by a user apparatus that divides first data into a plurality of first blocks according to a block size sent from a cryptographic processing apparatus, sends the plurality of first blocks to the cryptographic processing apparatus, and includes a data storage means for storing the first data, every cryptographic algorithm used by the cryptographic processing apparatus being a block cryptographic algorithm, the user method comprising:

an algorithm specifying step for outputting type information showing an algorithm type that corresponds to a cryptographic algorithm to the cryptographic processing apparatus;

a block size receiving step for receiving block size information showing a block size used by the cryptographic algorithm from the cryptographic processing apparatus;

a data output step for reading the first data from the data storage means, dividing the read first data according to the block size shown by the block size information to generate a plurality of first blocks, and outputting the plurality of first blocks to the cryptographic processing apparatus; and a block receiving step for receiving a plurality of second blocks generated by processing each of the plurality of first blocks according to the cryptographic algorithm from the cryptographic processing apparatus.

16. A computer-readable recording medium that records a cryptographic processing program used by a cryptographic processing apparatus that calculates a size of second data according to a size of first data sent from a user apparatus, sends the calculates size of the second data to the user apparatus, and includes an arithmetic expression storage means for storing at least one pair of an algorithm type and an arithmetic expression, the second data being generated by processing the first data according to a cryptographic algorithm, the arithmetic expression being used to calculate an output size from an input size, the output size showing a size of data that would be generated if data of the input size were processed according to a cryptographic algorithm that corresponds to the algorithm type in a same pair as the arithmetic expression, the cryptographic processing program comprising:

an information receiving step for receiving type information showing an algorithm type that corresponds to a cryptographic algorithm and first size information showing a first size from the user apparatus, the first size being the size of the first data;

an arithmetic expression fetching step for fetching an arithmetic expression in a same pair as the algorithm type shown by the type information from the arithmetic expression storage means; and     an output size calculation step for calculating the output size according to the fetched arithmetic expression with the first size shown by the first size information as the input size, and outputting second size information showing the calculated output size as a second size to the user apparatus.

17. A computer-readable recording medium that records a cryptographic processing program used by a cryptographic processing apparatus that sends a block size used by a cryptographic algorithm to a user apparatus, receives a plurality of first blocks generated by dividing first data according to the block size from the user apparatus, processes the plurality of first blocks according to the cryptographic algorithm, and includes a block size storage means for storing at least one pair of an algorithm type and a block size that is used by a cryptographic algorithm corresponding to the algorithm type in a same pair as the block size, every cryptographic algorithm used by the cryptographic processing apparatus being a block cryptographic algorithm, the cryptographic processing program comprising:

a receiving step for receiving type information showing an algorithm type that corresponds to a cryptographic algorithm from the user apparatus;

a block size fetching step for fetching a block size in a same pair as the algorithm type shown by the type information from the block size storage means;

a block size output step for outputting block size information showing the fetched block size to the user apparatus; and     a cryptographic processing step for receiving a plurality of first blocks generated by dividing the first data according to the block size shown by the block size information from the user apparatus, processing each of the received plurality of first blocks according to the cryptographic algorithm that corresponds to the algorithm type shown by the type information to generate a plurality of second blocks, and outputting each of the plurality of second blocks to the user apparatus.

18. A computer-readable recording medium that records a cryptographic processing program used by a cryptographic processing apparatus that sends a block size used by a cryptographic algorithm to a user apparatus, receives a plurality of first blocks generated by dividing first data according to the block size from the user apparatus, processes the plurality of first blocks according to the cryptographic algorithm, and includes an arithmetic expression storage means for storing at least one pair of an algorithm type and an arithmetic expression, the arithmetic expression being used to calculate a block size used by a cryptographic algorithm that corresponds to the cryptographic algorithm type in a same pair as the arithmetic expression according to a size of a key used by the corresponding cryptographic algorithm, every cryptographic algorithm used by the cryptographic processing apparatus being a block cryptographic algorithm, the cryptographic processing program comprising:

an information receiving step for receiving type information showing an algorithm type that corresponds to a cryptographic algorithm from the user apparatus;

a block size calculation step for fetching an arithmetic expression in a same pair as the algorithm type shown by the type information from the arithmetic expression storage means and calculating a block size according to the fetched arithmetic expression;

a block size output step for outputting a block size information showing the calculated block size to the user apparatus; and     a cryptographic processing step for receiving a plurality of first blocks generated by dividing the first data according to the calculated block size from the user apparatus, processing each of the received plurality of first blocks according to the cryptographic algorithm that corresponds to the algorithm type shown by the type information to generate a plurality of second blocks, and outputting each of the plurality of second blocks to the user apparatus.

19. A computer-readable recording medium that records a user program used by a user apparatus that sends a size of first data to a cryptographic processing apparatus, receives a size of second data from the cryptographic processing apparatus, and includes a data storage means for storing the first data, the second data being generated by processing the first data according to a cryptographic algorithm, the user program comprising:

an input size calculation step for reading the first data from the data storage means, calculating a size of the read first data as a first size, and outputting first size information showing the first size to the cryptographic processing apparatus;

an algorithm specifying step for outputting type information showing an algorithm type that corresponds to a cryptographic algorithm to the cryptographic processing apparatus; and     a size receiving step for receiving second size information showing a second size from the cryptographic processing apparatus, the second size being the size of the second data and being calculated according to the first size and the cryptographic algorithm that corresponds to the algorithm type shown by the type information.

20. A computer-readable recording medium that records a user program used by a user apparatus that divides first data into a plurality of first blocks according to a block size sent from a cryptographic processing apparatus, sends the plurality of first blocks to the cryptographic processing apparatus, and includes a data storage means for storing the first data, every cryptographic algorithm used by the cryptographic processing apparatus being a block cryptographic algorithm, the user program comprising:

an algorithm specifying step for outputting type information showing an algorithm type that corresponds to a cryptographic algorithm to the cryptographic processing apparatus;

a block size receiving step for receiving block size information showing a block size used by the cryptographic algorithm from the cryptographic processing apparatus;

a data output step for reading the first data from the data storage means, dividing the read first data according to the block size shown by the block size information to generate a plurality of first blocks, and outputting the plurality of first blocks to the cryptographic processing apparatus; and a block receiving step for receiving a plurality of second blocks generated by processing each of the plurality of first blocks according to the cryptographic algorithm from the cryptographic processing apparatus.

* * * * *